United States Patent [19]

Schur

[11] 4,066,794

[45] Jan. 3, 1978

[54] INSTANT YOGURT PREPARATION

[76] Inventor: Sylvia Schur, 171 Sutton Manor, New Rochelle, N.Y. 10805

[21] Appl. No.: 699,225

[22] Filed: June 23, 1976

[51] Int. Cl.$^2$ .......................... A23C 9/12; A23C 9/10; A23C 9/00

[52] U.S. Cl. ........................................ 426/61; 426/43; 426/583; 426/588

[58] Field of Search ...................... 426/34, 42, 43, 61, 426/583, 588

[56] References Cited

U.S. PATENT DOCUMENTS

| | | | |
|---|---|---|---|
| 3,080,236 | 3/1963 | Ferguson, Jr. | 426/61 |
| 3,793,465 | 2/1974 | Bohren | 426/43 X |
| 3,897,307 | 7/1975 | Porubean et al. | 426/61 X |

OTHER PUBLICATIONS

Chemicals used in Food Processing, National Research Council Publication 1274, Washington, D.C., 1965, (pp. 15 & 16).

Primary Examiner—David M. Naff

[57] ABSTRACT

An instant yogurt composition is prepared containing dried milk powder, a deactivated yogurt powder, a dormant yogurt culture, sugar, sodium alginate and a sequestrant such as EDTA. The composition is low in fat and free of starch. When reconstituted by admixture with water, the composition exhibits a smooth custard-like texture and possesses nutritional and medicinal properties comparable to that of natural yogurt.

5 Claims, No Drawings

INSTANT YOGURT PREPARATION

BACKGROUND OF INVENTION

This invention relates generally to food products, and more particularly to an instant yogurt preparation in dry particulate form which may be reconstituted by admixture with water to provide a product of acceptable texture and flavor and having high nutritional and medicinal value.

Yogurt is a form of fermented milk curdled to a smooth, creamy or custard-like consistency by lactic acid-producing micro-organisms. The production of natural yogurt entails the implant of a beneficial culture of Lactobacillus bulgaricus and sometimes Lactobacillus acidophilus in milk which is then allowed to incubate until these particular species of bacilli establish the proper pH in the milk, after which the milk is chilled to inhibit growth of undesirable microflora.

Because of rising public demand, yogurt is now factory-produced on a large scale and widely sold in supermarkets. But consumers sometimes find it inconvenient to purchase the fresh product or that the product is too costly. However, electrically-heated yogurt makers for do-it-yourselfers are also available so that yogurt can be made at home to suit individual taste. In producing yogurt at home, a yogurt starter in the form of plain yogurt or a commercially-available dried yogurt culture is added to whole or skimmed milk. But whether yogurt is factory-produced or home-made, the processing thereof is time consuming, for it takes many hours of fermentation under proper conditions for the natural yogurt to develop fully. Moreover, both products are highly perishable and require refrigeration for their period of freshness (up to about a week).

When yogurt containing an active culture is consumed, some bacilli pass unharmed through the stomach, for these species favor an acid medium and are therefore not totally destroyed by gastric juices. But when the bacilli find their way into the intestines, they may implant a favorable flora. In any case, whether or not an implant is effected, beneficial vitamins are ingested.

Yogurt is believed to have medicinal value in the control of intestinal fermentation in that it contributes bacteria which establish themselves in the lower intestine and predominate over putrefactive types. Because of this characteristic, yogurt is often prescribed to patients who are required to take large doses of antibiotic drugs. These drugs, as a side effect, act to kill beneficial intestinal bacteria, and it is often necessary, therefore, to replenish such bacteria.

A high quality natural yogurt is one which is low in fat and is starch-free, the yogurt being rich is protein, calcium and other ingredients regarded as beneficial nutrients. Yet while the benefits to be gained from yogurt cultures are recognized, not all brands of yogurt currently on the market include effective amounts of yogurt culture. Indeed, in some brands, mainly those of the premixed or Swiss type, the cultures are often deactivated by the processing.

The texture of a yogurt is also an important factor in determining its acceptability, for yogurt should be free of lumps or curds and exhibit a smooth, custard-like consistency until the set is broken and whey is released. Hence a high quality yogurt is one of good texture which is low in fat, free of starch, and includes effective amounts of active culture as well as protein, calcium and other useful nutrients.

Though some factory-produced yogurt brands currently on the market satisfy all requirements for a high quality product, and it is also possible using home yogurt makers, to provide a high-quality product, it has heretofore not been feasible to produce a satisfactory instant yogurt.

By a satisfactory instant yogurt is meant a dry preparation which can be stored indefinitely and which can be reconstituted simply by adding water and stirring the mixture for less than five minutes to produce a product having a texture, taste and nutritional properties very similar to natural yogurt.

The main value of an instant yogurt as against a natural yogurt resides in its convenience and is based on practical considerations. There are many situations in which a consumer does not have ready access to a supermarket, dairy, or other facility carrying natural yogurt. While the consumer can, if necessary, make yogurt at home, this is a time-consuming operation requiring some degree of skill and also dictating the use of refrigerator to chill and store the yogurt. But even when refrigerated, natural yogurt has a limited life. One cannot safely stock a refrigerator with a large supply of natural yogurt, for in about a week the entire supply might no longer be edible.

With a view to providing an instant yogurt which requires no refrigeration and has a long shelf life, the Ferguson, U.S. Pat. No. 3,080,236 discloses a preparation comprising a dried yogurt powder and a water-soluble dried milk as well as an edible fat and a water-soluble dried starch. Ferguson produces yogurt by adding water to this preparation and stirring. To produce the yogurt powder, Ferguson first makes natural yogurt by implanting a pure culture in milk and after incubation for 12 hours, the resultant yogurt is reduced in volume by evaporation, then placed in vacuum driers until all moisture is removed, after which the dried product is pulverized. In producing a powdered yogurt of this type, substantially all the beneficial micro-organisms are destroyed, and Ferguson's instant yogurt therefore is lacking in the full benefits of good quality natural yogurt.

Moreover, in Ferguson, starch is required to impart sufficient body to the final product, and an edible fat is needed to give the product the appearance and taste of yogurt. But from the dietary standpoint, the inclusion of starch and fat in the product is objectionable.

SUMMARY OF INVENTION

In view of the foregoing, it is the main object of this invention to provide an instant yogurt preparation which when admixed with water at ordinary temperature gives rise to a yogurt product of acceptable taste and texture.

More specifically, it is an object of this invention to provide an instant yogurt preparation that is free of starch and low in fat and includes a dormant culture as well as a deactivated yogurt powder whereby when the yogurt is reconstituted, it possesses nutritional and medicinal properties that substantially correspond to those of natural yogurt.

Also an object of this invention is to provide a packaged instant yogurt preparation that requires no refrigeration and has a prolonged shelf life.

Briefly stated, these objects are attained in an instant yogurt preparation which in addition to non-fat dried milk powder, yogurt powder and a dormant yogurt culture, includes sodium alginate acting as a setting agent so that when water is added to the dry blend, the alginate forms a viscous colloidal solution in which is dipsersed the milk and the yogurt constituents to impart natural yogurt-like properties to the resultant composition.

Also essential to the mixture is an organic dispersing agent, such as sugar, which acts to promote the uniform separation of the extremely fine particles in the solution and an organic sequestrant such as EDTA serving to inhibit precipitation reactions that would otherwise cause the sodium alginate when entering the solution to curdle and create lumps that impair the texture of the product.

Thus the resultant yogurt composition, which may further include flavoring and coloring agents, has a taste and texture which not only is virtually indistinguishable from natural yogurt, but also possesses nutritional and medicinal properties comparable to those of high quality natural yogurt.

DESCRIPTION OF INVENTION

In a preferred formulation for producing an instant yogurt preparation in accordance with the invention, the following ingredients are used in the weights and relative percentages indicated in the table below:

| | Ingredient | Grams | Percentage |
|---|---|---|---|
| I | yogurt powder | 5.00 | 11.56 |
| II | dried Lactobacillus culture | .04 | .10 |
| III | non-fat dry milk | 5.00 | 11.56 |
| IV | sodium alginate | 2.25 | 5.20 |
| V | sequestrant | .70 | 1.62 |
| VI | dispersing agent (sugar) | 30.00 | 69.26 |
| VII | flavoring agent | .25 | .58 |
| VIII | coloring agent | .05 | .12 |
| | | 43.35 | 100.00% |

Ingredient I

The yogurt powder may be of the type produced and sold by Beatrice Foods, National Dairy or other large suppliers of yogurt powder. Or it may be yogurt powder manufactured directly for use in production according to standard evaporation and drying techniques. While yogurt powder is made from natural yogurt containing an active culture, the processing of the natural yogurt with heat to remove all moisture therefrom acts to destroy the culture; hence yogurt powder is in the deactivated state.

Ingredient II

Dried Lactobacillus culture is commercially available— its usual use being as a culture for the production of natural yogurt. For purposes of inclusion in a blend in accordance with the invention, the dried culture in which the bacilli are in the dormant state and are activated when water is added to the preparation must be such that it has sufficient stability for storage at room temperatures.

To this end, use may be made of stabilized dried cultures of lactic acid-producing bacteria of the type described in the Porubcan et al. patent 3,897,307, assigned to Chr. Hensen's Laboratory, Inc.

While ingredient II is not essential to producing an instant yogurt having the taste and texture of natural yogurt, it serves, when ingested, to promote the growth of intestinal bacteria which are beneficial and hence imparts to the product the medicinal qualities of natural yogurt.

Ingredient III

The non-fat dried milk is available commercially in powder form and is preferably of a type that is almost instantly soluble. For this purpose, dried skimmed milk may be used which has been dehydrated to form a concentrated liquid, then subjected to a second spray drying so as to aerate the milk powder, thereby rendering it quickly soluble. In practice, one may also use dried soy bean milk and even dried sour cream, but dried skimmed milk is preferred. Any "instantized" milk would be suitable as ingredient III.

Ingredient IV

This ingredient, sodium alginate, is commercially available in powder form for use as a thickener and emulsifier in foods such as ice cream. Sodium alginate, sold under the trademark KelcoGel by Marine Colloids is acceptable as ingredient IV.

Sodium alginate, in the context of an instant yogurt preparation in accordance with the invention, functions as a gelling or setting agent to impart to the product a custard-like consistency having thixotropic qualities. When water is added to sodium alginate, it forms a viscous colloidal solution.

Ingredient V

The preferred sequestrant is available commercially as "Sequestrene" (Geigy Chemical Corp.), which is the trademark for a series of complexing agents and metal complexes consisting of ethylene diaminetetra acetic (EDTA). Sequestration usually refers to the formation of a coordination complex by certain phosphates with metallic ions in solution so that the usual precipitation reactions are prevented. This term is applicable to any instance in which an ion is prevented from exhibiting its usual properties due to close combination with an added material.

The two groups of organic sequestering agents of importance are the aminopolycarboxylic acids such as "Sequestrene" and the hydroxycarboxylic acids as gluconic, citric and tartaric acids.

The use of a sequestering agent is essential to the present invention, for it functions to inhibit a precipitation reaction of the sodium alginate which in the absence of sequestration would tend, when water is admixed with the instant yogurt blend, to curdle and form lumps impairing the texture of the product.

Ingredient VI

The function of sugar is that of a dispersing or surface-active agent, which when added to a suspending medium acts to promote uniform separation of extremely fine particles, particularly those of colloidal size. The sugar is preferably a finely powdered sucrose which dissolves quickly when water is added thereto.

Ingredient VII

The flavoring agent is preferably one imparting to the yogurt product fruit-like flavor, such as Givaudan R 10.035 which simulates a strawberry taste. This agent is optional, and one may provide a plain instant yogurt preparation to which is later added natural fruit.

Ingredient VIII

The coloring agent may be any acceptable coloring ingredient appropriate to the flavoring agent. Thus in the case of strawberry flavor, the appropriate coloring agent is FD and C Red 40.

The ingredients which constitute the preparation are dry blended and packaged in a hermetically-sealed envelope, such as a plastic-foil laminated envelope heat sealed to exclude air and moisture. So packaged, the preparation has an indefinite shelf life at ordinary room temperature.

To use the preparation, the package seal is ruptured and the dry preparation poured into a bowl to which water is added, the mix being thoroughly stirred for about a minute until yogurt is formed of the proper consistency. Should more yogurt be made than can be consumed at a sitting, it may be stored in a refrigerator in the manner of natural yogurt; but in that case, the life of the prepared yogurt is no longer than that of natural yogurt.

While there has been described a preferred formulation for an instant yogurt preparation in accordance with the invention, it will be appreciated that the invention is not limited to the specific examples of the dispersing, setting and sequestering agents disclosed herein, nor is it limited to the exact percentages given, for these percentages are not critical.

I claim:

1. An instant yogurt preparation adapted when mixed with water to form a composition whose smooth texture and nutritional value is comparable to that of natural yogurt, the preparation consisting essentially of dried yogurt powder in which the culture is deactivated, a dormant dried yogurt culture, water-soluble dried milk powder, sodium alginate in an amount of about 5.20 percent by weight to act as a setting agent to form a viscous colloidal solution in which the milk and yogurt constituents are dispersed, an organic dispersing agent to promote the uniform separation of the fine particles of the solution, said organic dispersing agent being sugar in an amount about 69.26% by weight, and a sequestrant constituted by EDTA in sufficient quantity to inhibit precipitation reactions that would otherwise cause the sodium alginate setting agent to curdle and create lumps in the composition.

2. A preparation as set forth in claim 1, wherein said dormant culture is constituted by a dried Lactobacillus culture.

3. A preparation as set forth in claim 1, further including flavoring and coloring agents.

4. A preparation as set forth in claim 3, wherein said flavoring agent has a fruit-like flavor and said coloring agent provides a color appropriate to the fruit.

5. A preparation as set forth in claim 1, wherein said dried milk is a non-fat skimmed milk.

* * * * *